United States Patent [19]

Page et al.

[11] Patent Number: 5,653,425

[45] Date of Patent: Aug. 5, 1997

[54] ENERGY ABSORBERS

[75] Inventors: Ronald C. Page; John J. Bushnell, both of Coventry; Carl F. Watts, Wardington, all of United Kingdom

[73] Assignee: Oleo International Limited, Conventry, United Kingdom

[21] Appl. No.: 564,288

[22] PCT Filed: Jun. 22, 1994

[86] PCT No.: PCT/GB94/01351

§ 371 Date: Dec. 21, 1995

§ 102(e) Date: Dec. 21, 1995

[87] PCT Pub. No.: WO95/00382

PCT Pub. Date: Jan. 5, 1995

[30] Foreign Application Priority Data

Jun. 22, 1993 [GB] United Kingdom ............... 9312866

[51] Int. Cl.$^6$ ............... B61G 11/12; F16F 9/06
[52] U.S. Cl. ............ 267/64.15; 188/282; 188/322.15; 188/317; 188/269; 188/322.22; 188/314; 213/43; 213/223; 267/116; 267/139; 267/64.26
[58] Field of Search ............... 267/64.15, 116, 267/124, 129, 139–140, 64.26, 64.25, 64.11; 188/322.15, 322.22, 269, 281, 282, 280, 316, 314, 317, 322.13; 213/223, 43; 293/134; 244/104 FP

[56] References Cited

U.S. PATENT DOCUMENTS

| 2,366,248 | 1/1945 | Focht ............... 188/280 |
| 2,788,092 | 4/1957 | Whisler, Jr. ............... 188/322.15 |
| 2,886,142 | 5/1959 | Orshansky, Jr. ............... 188/317 |
| 2,963,175 | 12/1960 | Thornhill ............... 213/223 |
| 3,178,166 | 4/1965 | Kirsch ............... 188/322.15 |
| 3,216,535 | 11/1965 | Schultze ............... 188/282 |
| 3,251,481 | 5/1966 | Karakashjan et al. ............... 213/43 |
| 3,389,766 | 6/1968 | Henry-Biabond ............... 188/317 |
| 3,554,387 | 1/1971 | Thornhill et al. ............... 267/64.26 |
| 3,656,632 | 4/1972 | Karakashian et al. ............... 213/43 |
| 3,662,649 | 5/1972 | Williams ............... 188/317 |
| 3,706,326 | 12/1972 | Faure ............... 188/317 |
| 3,814,219 | 6/1974 | Fannin et al. ............... 188/317 |
| 3,826,343 | 7/1974 | Heymann ............... 188/317 |
| 4,054,312 | 10/1977 | Strader, Jr. ............... 213/223 |
| 4,123,859 | 11/1978 | DeKoning ............... 188/282 |
| 4,660,687 | 4/1987 | Williams et al. ............... 188/287 |
| 4,850,461 | 7/1989 | Rubel ............... 188/322.15 |
| 5,487,480 | 1/1996 | Page et al. ............... 18/287 |

FOREIGN PATENT DOCUMENTS

| 1109206 | 6/1961 | Germany . |
| 1775196 | 7/1971 | Germany . |
| 3613677 | 10/1987 | Germany . |
| 0982641 | 2/1965 | United Kingdom . |
| 1038662 | 8/1966 | United Kingdom . |
| 1266596 | 3/1972 | United Kingdom . |

Primary Examiner—Douglas C. Butler
Attorney, Agent, or Firm—Birch, Stewart, Kolasch & Birch, LLP

[57] ABSTRACT

A railway buffer capsule comprising a hollow cylindrical plunger slidably mounted in a cylinder. The cylinder is closed at one end. The plunger is closed at its outer end, and in its inner end is formed a fixed area orifice of flow restricting dimensions. A floating piston slides in the bore of the plunger and separates a liquid reservoir from the remainder of the interior of the plunger which comprises a gas containing space. A stepped piston has its larger diameter exposed to pressure in the reservoir and its smaller diameter end adapted to seat and close the orifice and be exposed to compression chamber pressure. The combination of the stepped piston and the orifice is a multiplier valve which multiplies the resistance of the compressed gas to lengthwise compression of the buffer.

20 Claims, 2 Drawing Sheets

5,653,425

ENERGY ABSORBERS

DESCRIPTION

1. Field of the Invention

This invention relates to energy absorbers of the kind which comprise a cylinder and a hollow plunger slidable in the cylinder, the plunger having its interior divided into a gas containing space and a liquid reservoir by a movable wall and being provided with means whereby the liquid reservoir communicates with a liquid compression chamber formed within the cylinder outside the plunger, liquid displaced from the compression chamber into the reservoir by lengthwise compression of the absorber acting on the movable wall to displace it and thereby cause compression of gas within the gas containing space such that lengthwise compression of the absorber is resisted by compressed gas within the gas containing space which also provides a recoil force, there being liquid damping means which provide further resistance to compression of the absorber and damp the recoil force under certain conditions of operation. Such an energy absorber shall be referred to as "an energy absorber of the kind referred to" throughout the remainder of this specification.

2. Description of the Background Art

DE-B-1109206 discloses the use in an energy absorber of the kind referred to of a spring-closed pressure relief valve which is operable to open against the spring loading to allow displacement of liquid from the compression chamber into the liquid reservoir through an orifice which serves as the liquid damping means, when the liquid pressure acting on the obturating member of the pressure relief valve to open it reaches a certain threshold pressure which is many times higher than gas pressure within the gas containing space. The spring loading of the obturator of the pressure relief valve is applied by a stack of spring washers and is substantial. Liquid pressure loading on that obturator is insignificant compared to the load exerted by that stack of spring washers. That is so also with the energy absorber of the kind referred to disclosed by DE-A-3613677 which also includes a spring closed valve which is opened by liquid pressure in the compression chamber to allow displacement of liquid from the compression chamber to the liquid reservoir. The damping characteristics of the latter energy absorber are determined by the level of prestressing of the springs.

In order to provide the desired velocity dependent characteristics, it has always been thought necessary for the liquid damping means to comprise an orifice arrangement of flow restricting dimensions, the effective area of which is varied with relative telescopic movement between the hollow plunger and the cylinder, the effective area diminishing as the energy absorber contracts and increasing as it extends.

GB-A-982641 and GB-A-1266596 disclose examples of "an energy absorber of the kind referred to" which forms part of a side buffer for use on railway vehicles to absorb shock loads transmitted from one vehicle to another during acceleration and deceleration of a train, or during wagon impacts in marshalling yards and which, in the conventional manner, incorporate a profiled pin which, with inward movement of the plunger, provides increasing restriction of an orifice through which the liquid reservoir communicates with the liquid compression chamber.

SUMMARY OF THE INVENTION

An object of this invention is to provide an energy absorber of the kind referred to which is less expensive to manufacture but which will have substantially the same 'so-called' static and dynamic performance characteristics when used in a side buffer as an energy absorber which is similar to those disclosed by GB-A-982641 and GB-A-1266596.

Rather than using a variable area orifice arrangement of flow restricting dimensions as is conventional, by this invention we use a fixed area orifice of flow restricting dimensions as the liquid damping means of an energy absorber of the kind referred, in combination with a multiplier valve which cooperates with that orifice to multiply the resistance of the compressed gas within the gas containing space to lengthwise compression of the absorber.

According to this invention there is provided an energy absorber of the kind referred to, wherein the means whereby the liquid reservoir communicates with the liquid compression chamber comprises an orifice formed in the plunger and the liquid damping means consist solely in that orifice and a valve which is operable to inhibit passage of liquid through the orifice from the compression chamber to the reservoir chamber when a force which is less than a predetermined threshold force is applied to urge the plunger axially into the cylinder and to open to allow displacement of liquid from the compression chamber to the reservoir chamber through the orifice when a force which is greater than the predetermined threshold force is applied to urge the plunger into the cylinder chamber, wherein the valve comprises an obturating member which is a differential area piston, the larger surface area of which differential area piston is exposed to liquid in the reservoir chamber and the smaller diameter end portion of which differential area piston is adapted to seat on the perimeter of the orifice when the valve closes that orifice.

Theoretically use of a fixed area orifice of flow restricting dimensions as liquid damping means of an energy absorber should not be satisfactory because it should function like a dashpot with a single hole and as such it should not provide effective metering of the flow of liquid displaced from the compression chamber to the liquid reservoir. However, when used in combination with gas in the gas containing space of an energy absorber of the kind referred to, and with the differential area piston that interacts with the fixed area orifice of flow restricting dimensions as a multiplier valve which multiplies the action of the gas in the gas containing space, the resultant effect of that combination is a performance characteristic which is a surprisingly good approximation to the performance characteristics of a typical energy absorber of the kind referred to which incorporates the conventional arrangement of a profiled pin which with inward movement of the plunger, provides increasing restriction of the orifice through which liquid is displaced from the compression chamber to the liquid reservoir.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A railway side buffer in which this invention is embodied will be described now by way of example with reference to the accompanying drawings, which are given by way of illustration only, and thus are not limitative of the present invention, and of which.

DETAILED DESCRIPTION OF THE PREFERRED EMBODIMENTS

Figure 1:
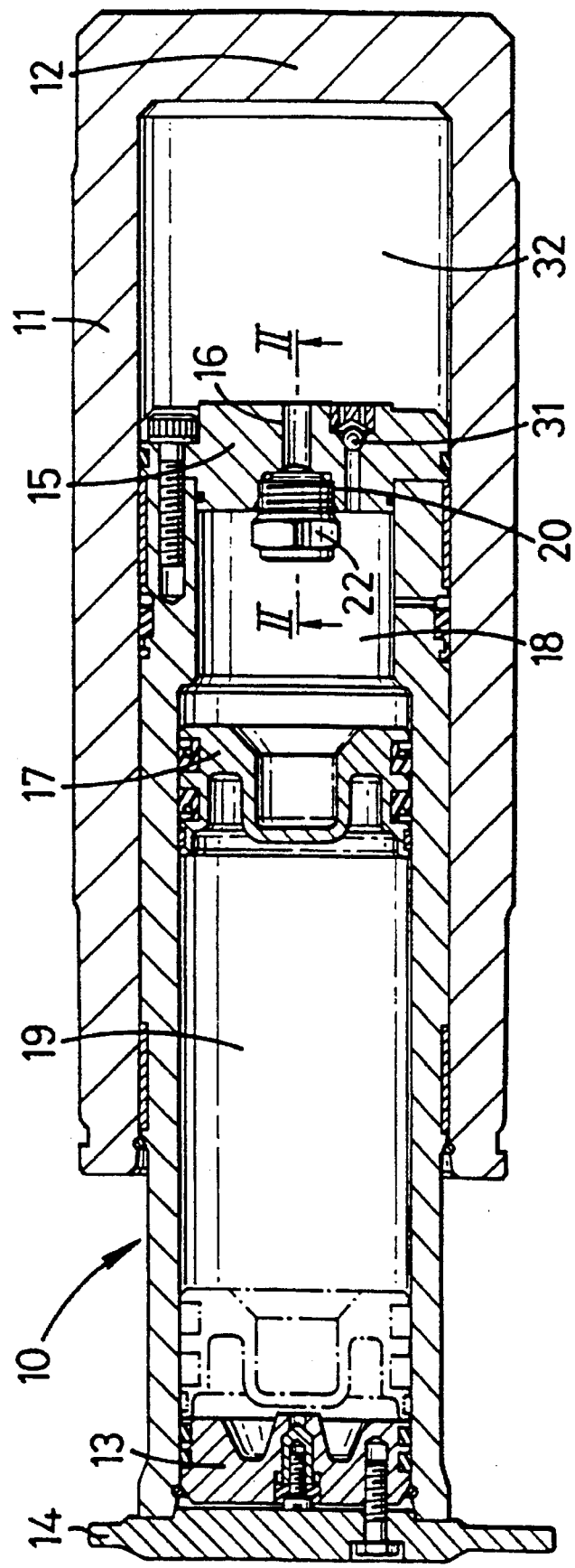
FIG. 1 is a transverse cross-section of the buffer.

FIG. 1 shows a railway buffer capsule comprising a hollow cylindrical plunger 10 slidably mounted in a cylinder 11. The cylinder 11 is closed at one end 12. The plunger 10 is closed at its outer end 13 to which a buffer plate 14 is fixed and at its inner end it has an end wall 15 in which is formed a central aperture 16.

A floating piston 17 slides in the bore of the plunger 10 and separates a liquid reservoir 18, which is formed within the plunger 10 adjacent the inner end wall 15, from the remainder of the interior of the plunger 10. The interior of the plunger between the floating piston 17 and the outer end wall 13 comprises a gas containing space 19 which is filled with compressed gas, such as nitrogen, on assembly of the buffer.

Figure 2:
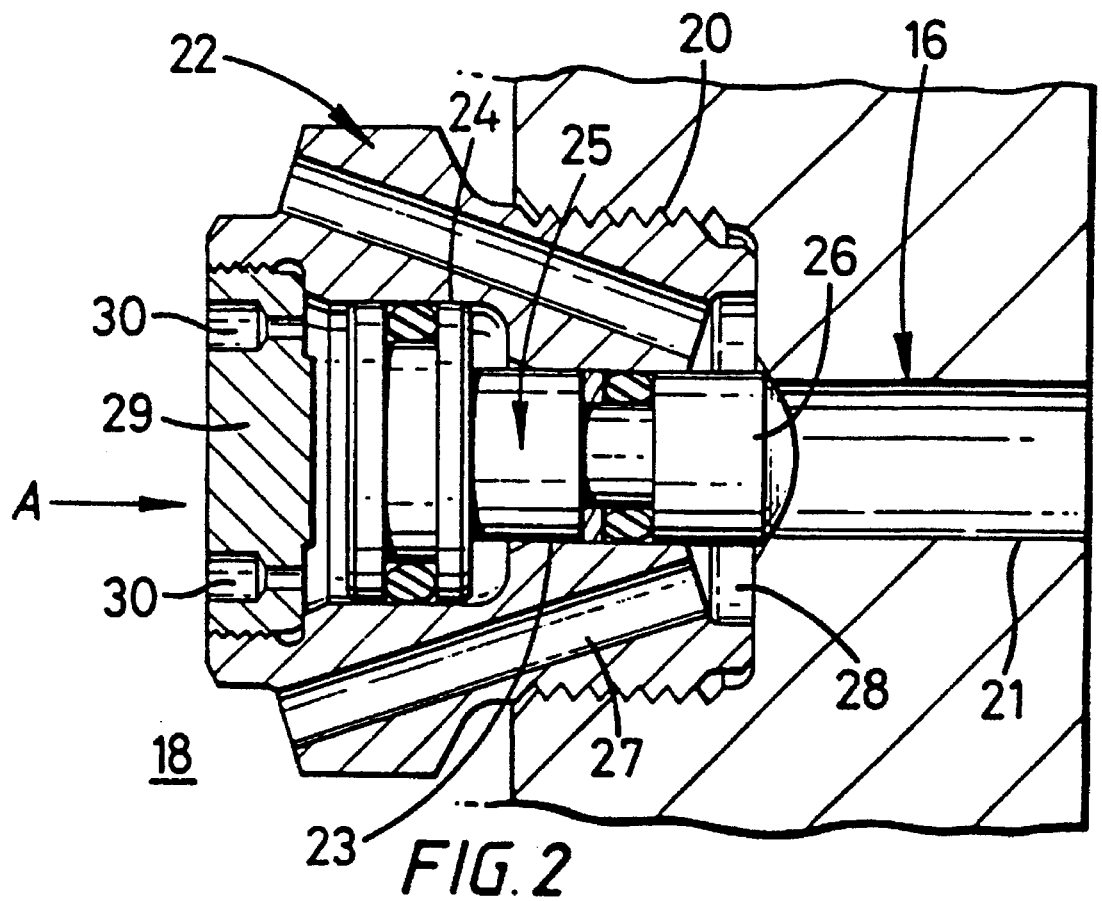
FIG. 2 is an enlarged cross-section detail on the line II—II of FIG. 1.
Figure 3:
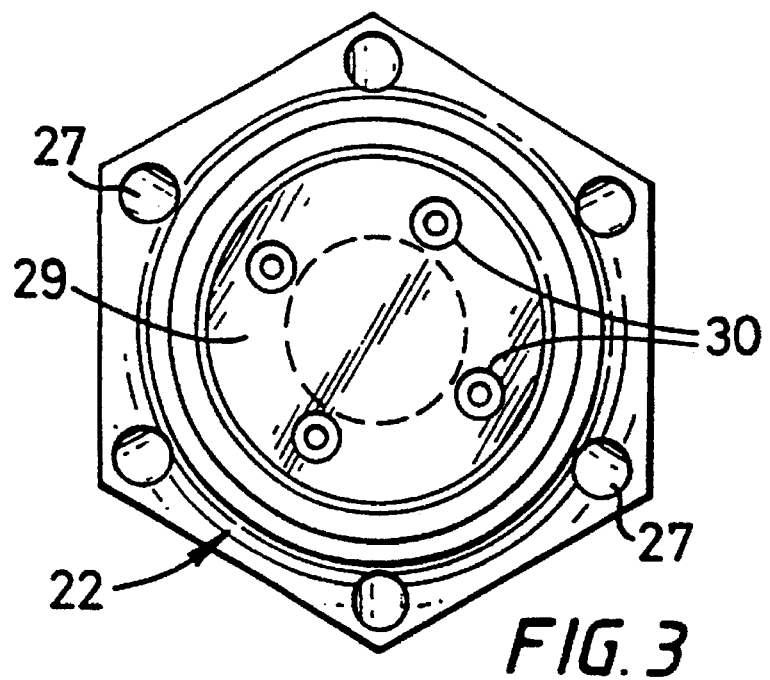
FIG. 3 is an end view of the valve shown in FIG. 2 as seen in the direction of arrow A in FIG. 2.

FIG. 2 shows central aperture 16 is stepped, having a tapped inner bore portion 20 at its end which is nearer to the floating piston 17 and a smaller diameter bore portion 21 at its end nearer the closed outer end wall 12 of the cylinder 11, the smaller diameter bore portion 21 forming an orifice of flow restricting dimensions. An annular valve body 22, is screwed into the tapped, bore portion 20 so that its end face abuts the end wall of the bore 20. The bore of the annular valve body 22 is stepped. A smaller diameter portion 23 of the stepped bore is nearer to the smaller diameter bore portion 21 than is the larger 24 of the two bore portions of the stepped bore of the valve body 22.

A solid stepped or differential area piston 25 is a sliding fit in the stepped bore of the annular valve body 22 and its smaller diameter end 26 is adapted to seat in the orifice 21 so as to serve as an obturating member. Surrounding the solid stepped piston 25 at its smaller end is an annular chamber 28 formed between the valve body 22 and the step between the orifice 21 and the tapped bore portion 20. Communication means, for the flow of liquid from the compression chamber 32 via the annular chamber 28 to the reservoir chamber 18 is formed in the valve body 22 by passages 27. The solid stepped piston 25 slides in the stepped through bore in the valve body 22. The annular surface area of the larger diameter end of the stepped piston 25 is several times larger than the cross-sectional area of the orifice 21. The outer end of the larger diameter portion 24 is closed by an end plug 29. Damping holes 30 are provided in the end plug 29 to prevent damage to the stepped piston 25.

FIG. 1 shows a non-return valve 31 which allows one-way flow from the reservoir chamber 18 to a compression chamber 32 which is formed in the cylinder 11 between the closed end wall 12 and the hollow plunger 10.

In use, the cylinder 11 is mounted on structure of a railway vehicle. When the buffer is unloaded, the compressed gas will have caused the plunger 10 to have taken up the position within the cylinder 11 in which the liquid pressure loading across its end wall 15 is balanced and the floating piston 17 to have taken up the position within the plunger 10 in which the fluid pressure loading across it is balanced. The differential area piston 25 will be seated to close the orifice 21 in the end wall.

In the event of the buffer being compressed by the application of an impact force to the buffer plate 14 whilst the buffer is stationery, there will be an instantaneous increase in the pressure within the compression chamber 32 because the plunger 10 is sealed by the differential area piston portion 25 being seated. When the applied impact force reaches a certain predetermined level (say 10 KN) the pressure in the compression chamber 32 will rise sufficiently above that in the reservoir chamber 18 to unseat the differential area piston 25. Hence liquid will be displaced from the compression chamber 32 into the reservoir chamber 18 so that the floating piston 17 will be displaced to reduce the volume of the gas containing space 19 and increase the pressure of gas therein and thus to increase the recoil force.

Energy will be absorbed by displacement of the liquid through the differential area piston 25 depending on the rate of further compression of the buffer. Either the differential area piston 25 will remain unseated so that displacement of liquid through it from the compression chamber 32 to the reservoir chamber 18 will continue or, if the further compression is slow, the differential area piston 25 may act as a shuttle valve being alternately reseated and unseated, further such liquid displacement through it occurring when it is unseated.

Compression of the buffer stops when the energy of the impact force has been absorbed. When the applied load is released so that the buffer can be extended the gas in the gas containing space 19 expands to urge the floating piston 17 towards the end wall 15 in the usual way. Liquid is displaced from the reservoir chamber 18 via the non-return valve 31 into the compression chamber 32 which urges the plunger 10 out of the cylinder 11 in the usual way.

The basic energy absorber capsule comprising the hollow plunger 10 and the cylinder 11 may be used in other forms of energy absorber. In one example, it may be incorporated in railway drawgear which may comprise an end of car coupler.

A consequence of the incorporation of the multiplier valve which comprises the combination of the differential area piston 25 and the fixed area orifice 21 is that the pressure to which the gas containing space 19 is inflated need not be so high as would otherwise be necessary which is advantageous from the safety viewpoint.

The invention being thus described, it will be obvious that the same may be varied in many ways. Such variations are not to be regarded is a departure from the spirit and scope of the invention, and all such modifications as would be obvious to one skilled in the art are intended to be included within the scope of the following claims.

We claim:

1. An energy absorber comprising a cylinder and a hollow plunger slidable in the cylinder, the plunger having an interior divided into a gas containing space and a liquid reservoir by a movable wall and being provided with means whereby the liquid reservoir communicates with a liquid compression chamber formed within the cylinder outside the plunger, liquid displaced from the compression chamber into the reservoir by lengthwise compression of the absorber acting on the movable wall to displace the wall and thereby cause compression of gas within the gas containing space such that the lengthwise compression of the absorber is resisted by compressed gas within the gas containing space which also provides a recoil force, there being liquid damping means which provide further resistance to compression of the absorber and damp the recoil force under certain conditions of operation, and in which the means whereby the liquid reservoir communicates with the liquid compression chamber comprises an orifice formed in the plunger and the liquid damping means consist solely in that orifice and a valve which is operable to inhibit passage of liquid through the orifice from the compression chamber to the reservoir chamber when a force which is less than a predetermined threshold force is applied to urge the plunger axially into the cylinder, the valve being openable for displacement of liquid from the compression chamber through the orifice when a force which is greater than the predetermined threshold force is applied to urge the plunger into the liquid compression chamber, the valve comprising a stepped piston which has two ends and an intermediate portion which is slidably fit in structure of the plunger between said compression chamber and the reservoir, the diameter of the stepped piston being smaller at one of its ends than at the other of its ends, the smaller diameter end of the piston serving as an obturating member seatable on a valve seat formed around the orifice to thereby close the orifice and the larger diameter end being exposed to liquid in the reservoir chamber.

2. The energy absorber according to claim 1 which is incorporated in a railway side buffer.

3. The energy absorber according to claim 1, further comprising a buffer plate mounter on the plunger at an end opposite the orifice, force being applied to the energy absorber at the buffer plate.

4. The energy absorber according to claim 1, wherein the stepped piston is mounted in a valve body mounted on an end of the plunger adjacent the orifice, the valve body having a stepped bore with a smaller diameter bore portion and a larger diameter bore portion.

5. The energy absorber according to claim 4, wherein the valve body further has an annular chamber surrounding the smaller end of the piston, the annular chamber being adjacent the orifice.

6. The energy absorber according to claim 5, further comprising a plurality of passages formed in the valve body from the annular chamber to the reservoir, liquid being flowable from the compression chamber through the orifice, through the annular chamber and through the plurality of passages when the valve is opened.

7. The energy absorber according to claim 6, wherein the plurality of passages each have a longitudinal axis and the orifice has a longitudinal axis, the longitudinal axes of the passages being nonperpendicular and nonparallel to the longitudinal axis of the orifice.

8. The energy absorber according to claim 1, further comprising a passage With a non-return value provided on an end of the plunger, liquid being flowable from the reservoir to the compression chamber through the passage in the end of the plunger but the non-return valve preventing flow of liquid from the compression chamber to the reservoir through the passage in the end of the plunger.

9. An energy absorber comprising:
a cylinder and a hollow plunger slidable in the cylinder, the plunger having an interior and a movable wall being provided in the interior of the plunger, the movable wall dividing the interior into a gas containing space and a liquid reservoir, the cylinder having a liquid compression chamber therein;

means for communicating the liquid reservoir with the liquid compression chamber, the means for communicating comprising an orifice formed in the plunger, liquid being displacable from the liquid compression chamber into the reservoir by lengthwise compression of the energy absorber acting on the movable wall to displace the movable wall and thereby cause compression of gas within the gas containing space such that the lengthwise compression of the energy absorber is resisted by compressed gas within the gas containing space which also provides a recoil force;

liquid damping means for further resisting compression of the energy absorber and damping recoil force when a predetermined force acts on the absorber, the liquid damping means comprises a valve for inhibiting passage of liquid through the orifice from the compression chamber to the reservoir chamber when a force which is less than a predetermined threshold force is applied to urge the plunger axially into the cylinder, the valve being openable for displacement of liquid from the compression chamber through the orifice when a force which is greater than the predetermined threshold force is applied to urge the plunger into the liquid compression chamber, the valve comprising a stepped piston having first and second ends and an intermediate portion which is slidably fit in the plunger between said compression chamber and the reservoir, a diameter of the first end of the piston being smaller than a diameter of the second end of the piston, the first end of the piston serving as an obturating member seatable on a valve seat formed around the orifice to thereby close the orifice, the second end of the piston being exposed to liquid in the reservoir chamber.

10. The energy absorber according to claim 9, wherein the liquid compression chamber of the cylinder is outside the plunger.

11. The energy absorber according to claim 9, further comprising a valve body mounted on an end of the plunger, the orifice being in an end of the plunger and the valve being contained entirely Within the valve body and the end of the plunger.

12. The energy absorber according to claim 9, wherein the valve is mounted within the plunger and is movable with the plunger.

13. The energy absorber according to claim 9, wherein the valve is out of contact with the cylinder.

14. The energy absorber according to claim 9, wherein the cylinder has a closed end forming the liquid compression chamber, the orifice only being closed by the stepped piston, the stepped piston being at an end of the Orifice which is distal from an end of the orifice closest to the closed end of the cylinder.

15. The energy absorber according to claim 9, further comprising a buffer plate mounter on the plunger at an end opposite the orifice, force being applied to the energy absorber at the buffer plate, the energy absorber being incorporated in a railway side buffer.

16. The energy absorber according to claim 9, wherein the stepped piston is mounted in a valve body mounted on an end of the plunger adjacent the orifice, the valve body having a stepped bore with a smaller diameter bore portion and a larger diameter bore portion.

17. The energy absorber according to claim 16, wherein the valve body further has an annular chamber surrounding the first end of the piston, the annular chamber being adjacent the orifice.

18. The energy absorber according to claim 17, further comprising a plurality of passages formed in the valve body from the annular chamber to the reservoir, liquid being flowable from the compression chamber through the orifice, through the annular chamber and through the plurality of passages when the valve is opened.

19. The energy absorber according to claim 18, wherein the plurality of passages each have a longitudinal axis and the orifice has a longitudinal axis, the longitudinal axes of the passages being nonperpendicular and nonparallel to the longitudinal axis of the orifice.

20. The energy absorber according to claim 9, further comprising a passage with a non-return valve provided on an end of the plunger, liquid being flowable from the reservoir to the compression chamber through the passage in the end of the plunger but the non-return valve preventing flow of liquid from the compression chamber to the reservoir through the passage in the end of the plunger.

* * * * *